(12) United States Patent
Lawler et al.

(10) Patent No.: US 10,048,158 B2
(45) Date of Patent: Aug. 14, 2018

(54) STABILITY WARNING AND CONTROL INTERVENTION SYSTEM FOR A FORESTRY VEHICLE

(71) Applicant: Deere & Company, Moline, IL (US)

(72) Inventors: Richard J. Lawler, Dubuque, IA (US); Bryon P. Neumann, Brantford (CA)

(73) Assignee: DEERE & COMPANY, Moline, IL (US)

( * ) Notice: Subject to any disclaimer, the term of this patent is extended or adjusted under 35 U.S.C. 154(b) by 22 days.

(21) Appl. No.: 15/282,213

(22) Filed: Sep. 30, 2016

(65) Prior Publication Data

US 2017/0089797 A1    Mar. 30, 2017

Related U.S. Application Data

(60) Provisional application No. 62/235,489, filed on Sep. 30, 2015.

(51) Int. Cl.
| | |
|---|---|
| *G01M 1/12* | (2006.01) |
| *A01G 23/081* | (2006.01) |
| *A01G 23/083* | (2006.01) |
| *B60Q 5/00* | (2006.01) |
| *B60Q 1/00* | (2006.01) |
| *B60Q 9/00* | (2006.01) |

(52) U.S. Cl.
CPC ........... *G01M 1/122* (2013.01); *A01G 23/081* (2013.01); *B60Q 1/00* (2013.01); *B60Q 5/005* (2013.01); *B60Q 9/00* (2013.01)

(58) Field of Classification Search
None
See application file for complete search history.

(56) References Cited

U.S. PATENT DOCUMENTS

| | | | | |
|---|---|---|---|---|
| 6,437,701 | B1* | 8/2002 | Muller | E02F 9/24 340/440 |
| 7,012,540 | B2* | 3/2006 | Petzold | B66C 23/78 340/440 |
| 9,082,288 | B2 | 7/2015 | Wei et al. | |
| 2004/0232632 | A1* | 11/2004 | Beck | B60G 17/016 280/5.5 |
| 2011/0023999 | A1* | 2/2011 | Milne | A01G 23/08 144/335 |
| 2011/0042164 | A1* | 2/2011 | Clark | B66F 17/006 182/2.2 |
| 2012/0232763 | A1* | 9/2012 | Mizuochi | B66C 23/905 701/50 |
| 2013/0066527 | A1* | 3/2013 | Mizuochi | B66C 23/905 701/50 |
| 2013/0213920 | A1* | 8/2013 | Oliver | B66C 23/62 212/302 |

(Continued)

*Primary Examiner* — Rami Khatib
(74) *Attorney, Agent, or Firm* — Michael Best & Friedrich LLP (57) ABSTRACT

A stability warning system for a tree feller-buncher includes a first inertial measurement unit configured to measure an orientation of an undercarriage of the tree feller-buncher carrying at least one track, a second inertial measurement unit configured to measure an orientation of a boom coupled to the turntable, and a felling head operably connected to the boom. A controller is operable to estimate a center of gravity of the tree feller-buncher based on the measured orientation of the undercarriage and the measured orientation of the boom.

42 Claims, 4 Drawing Sheets

(56) References Cited

U.S. PATENT DOCUMENTS

| | | | |
|---|---|---|---|
| 2015/0210515 A1* | 7/2015 | Pech | B66C 23/76 |
| | | | 212/197 |
| 2015/0219213 A1* | 8/2015 | Neumann | F16H 61/20 |
| | | | 701/50 |
| 2016/0088787 A1* | 3/2016 | Connell | A01B 76/00 |
| | | | 701/50 |
| 2016/0369480 A1* | 12/2016 | Mizuochi | E02F 9/2207 |
| 2017/0135287 A1* | 5/2017 | Prohaska | A01G 3/088 |

* cited by examiner

STABILITY WARNING AND CONTROL INTERVENTION SYSTEM FOR A FORESTRY VEHICLE

CROSS-REFERENCE TO RELATED APPLICATIONS

This application claims priority to U.S. Provisional Patent Application No. 62/235,489, filed on Sep. 30, 2015, and entitled Stability Warning System for a Forestry Vehicle, the entire content of which is hereby incorporated by reference in its entirety.

BACKGROUND

The present disclosure relates to systems and methods for felling trees, in particular with a forestry vehicle. More specifically, the present disclosure relates to a stability warning system for a tree feller-buncher.

Tree felling is the process of downing individual trees. Tree felling can be performed by hand (i.e., using an axe, saw, chainsaw, or other handheld device) or with mechanical assistance (i.e., using one or more pieces of logging equipment). A tree feller-buncher is a motorized mechanical felling vehicle that carries an attachment that cuts and gathers one or more trees during the process of tree felling. While a tree feller-buncher has certain advantages over hand felling, it has certain limitations. For example, sub-optimal operation in terrain having steep or unpredictable slopes, or unpredictable ground conditions (e.g., wet, boggy, or unstable soils, surface depressions, frequent stumps, etc.). In terrain where a tree feller-buncher cannot be used at all, felling crews must turn to hand felling.

SUMMARY

In one aspect, the disclosure provides a stability warning system for a tree feller-buncher. The stability warning system includes a first inertial measurement unit configured to measure an orientation of an undercarriage of the tree feller-buncher carrying at least one track, a second inertial measurement unit configured to measure an orientation of a boom coupled to the turntable, and a felling head operably connected to the boom. A controller is operable to estimate a center of gravity of the tree feller-buncher based on the measured orientation of the undercarriage and the measured orientation of the boom.

In another aspect, the disclosure provides a method of providing a stability warning for a tree feller-buncher. The method includes measuring with a first inertial measurement unit an orientation of an undercarriage of the tree feller-buncher carrying at least one track, measuring with a second inertial measurement unit an orientation of a boom coupled to the turntable, and estimating with a controller in operable communication with the first and second inertial measurement units a center of gravity of the tree feller-buncher based on the measured orientation of the undercarriage and the measured orientation of the boom.

In another aspect, the disclosure provides a stability warning system for a tree feller-buncher that includes a first inertial measurement unit configured to measure an orientation of an undercarriage of the tree feller-buncher carrying at least one track, a second inertial measurement unit configured to measure an orientation of a boom coupled to the turntable, and a felling head operably connected to the boom. A controller is configured to notify an operator of a potentially unstable position of the tree feller-buncher based at least in part on the measured orientation of the undercarriage and the measured orientation of the boom.

Other aspects of the disclosure will become apparent by consideration of the detailed description and accompanying drawings.

DETAILED DESCRIPTION

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

The term calculating (or calculate and calculated), as used herein, is used with reference to calculations performed by the disclosed system. The term includes calculating, determining, and estimating. Also, various embodiments of the systems and methods herein are disclosed as being applied on or used in conjunction with tree feller-bunchers. As used herein an in the appended claims, the term "feller-buncher" encompasses tree fellers, feller-bunchers, harvesters, and any similar machine or device adapted to move or transport cut trees. In some embodiments, the systems and methods disclosed herein are particularly well-suited for application on or use in conjunction with equipment having one or more blades used to cut trees.

Figure 1:
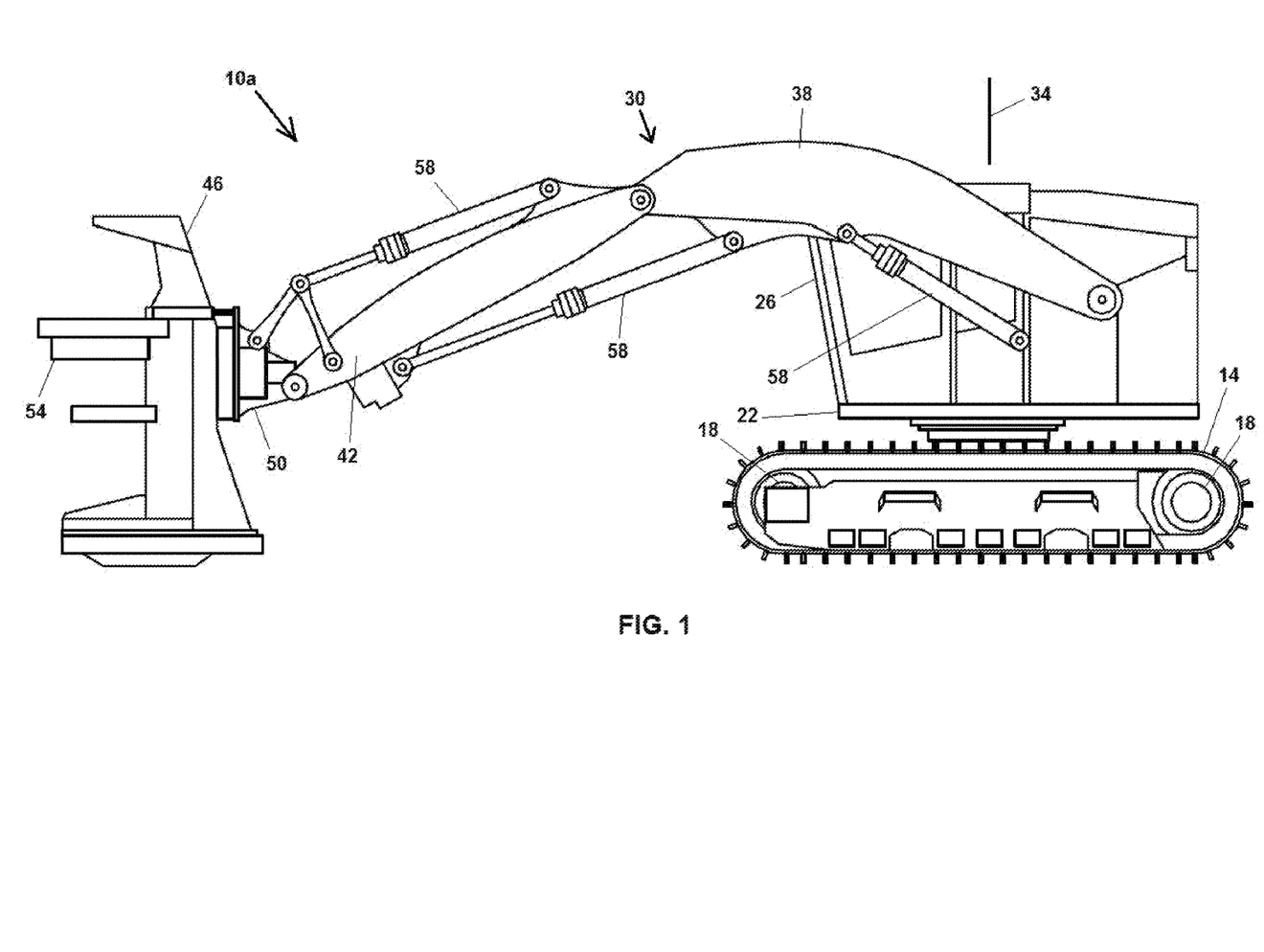
FIG. 1 is a side view of a non-leveling tracked tree feller-buncher.

FIG. 1 illustrates an embodiment of a non-leveling tree feller-buncher 10a. The tree feller-buncher 10a includes a plurality of tracks 14 that are connected to an undercarriage or frame 20 (shown in FIG. 3). Each track 14 includes drive wheels 18 that rotate with respect to an axle (not shown) carried by the undercarriage 20 to rotate the track 14. The undercarriage 20 is attached to a turntable 22 presenting a face that carries a cab 26 and a boom 30. The turntable 22 rotates about a first axis 34, allowing the turntable 22 (and attached cab 26 and boom 30) to rotate with respect to, and independent of, the undercarriage 20 and attached tracks 14. In the illustration, the axis 34 is approximately perpendicular to the face of the turntable 22. However, in other constructions the axis 34 may be positioned at any suitable orientation to one or more components of the tree feller-buncher 10a to facilitate rotation of the turntable 22 with respect to the undercarriage 20 (and the tracks 14). The turntable 22 rotates with respect to the axis 34 three hundred and sixty degrees (360°). However, in other constructions the turntable 22 can rotate about the axis 34 less than three hundred and sixty degrees (360°). The cab 26 houses controls and an operator for operation of the tree feller-buncher 10a.

The boom 30 is pivotably connected to the turntable 22 and includes a plurality of sub-booms that define an articulated arm. The boom 30 includes a main boom or first boom 38 coupled to the turntable 22. A stick boom or second boom 42 is pivotably connected to the main boom 38. The stick boom 42 is also pivotably connected to a felling head 46 by a wrist adapter 50. The wrist adapter 50 facilitates both pivotable movement and rotational movement of the felling head 46 in relation to the stick boom 42. The felling head 46 includes a plurality of arms 54 that pivot with respect to the felling head 46 to grab, retain, and release one or more trees during the felling and bunching process. A plurality of hydraulic cylinders 58 are positioned between the turntable 22 and the main boom 38, between the main boom 38 and the stick boom 42, and between the stick boom 42 and the wrist adapter 50. The hydraulic cylinders 58 are operable to move the respective main boom 38, stick boom 42, and wrist adapter 50. Additional hydraulic connections (not shown) facilitate movement of the felling head 54.

The tree feller-buncher 10a is non-leveling in that the orientation of the turntable 22 is dependent on the orientation of the undercarriage 20 (shown in FIG. 3) and the tracks 14. Stated another way, the turntable 22 cannot be repositioned independent of the undercarriage 20 and the tracks 14. Accordingly, the orientation of the turntable 22 (along with the attached cab 26 and the boom 30) is influenced by the ground or terrain encountered by the tracks 14.

Figure 2:
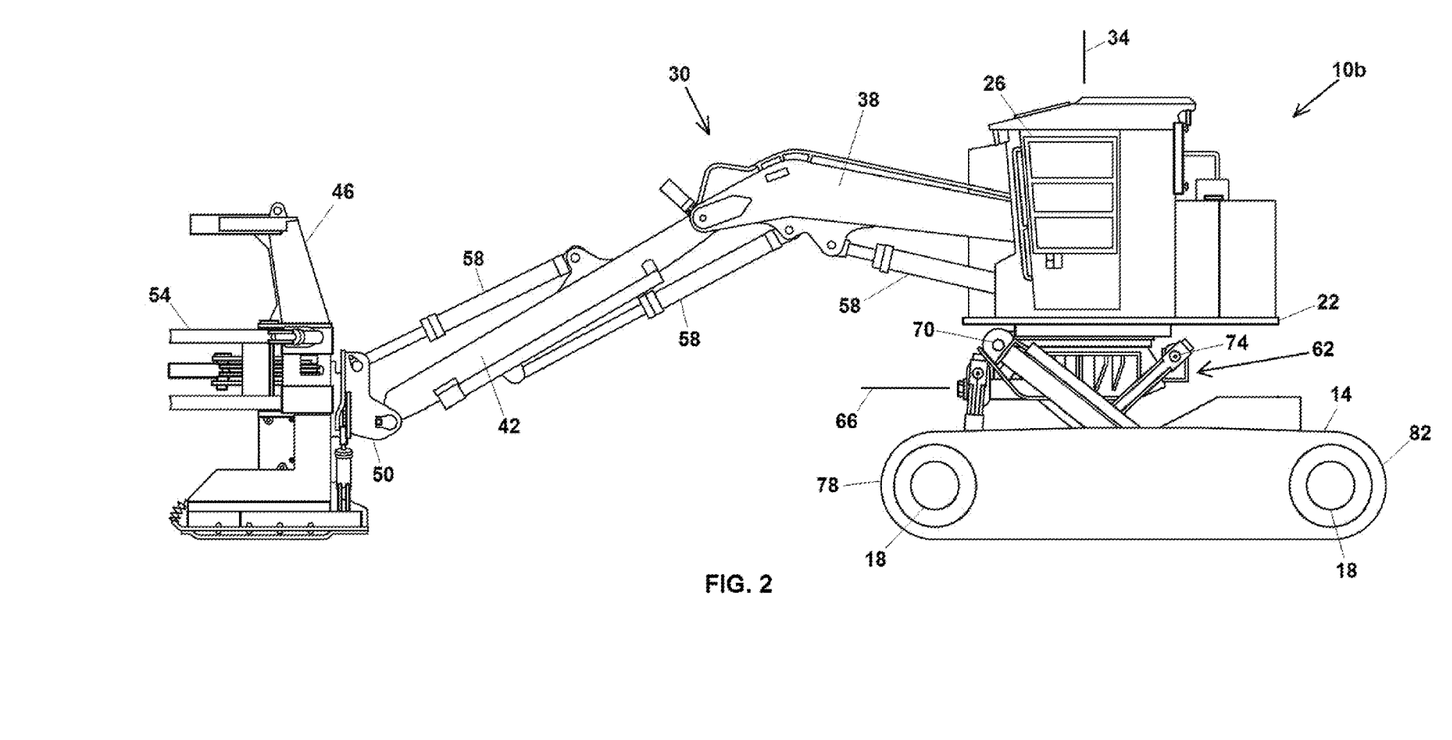
FIG. 2 is a side view of a leveling tracked tree feller-buncher.

FIG. 2 illustrates an embodiment of a leveling tree feller-buncher 10b. The leveling tree feller-buncher 10b is substantially the same as the non-leveling tree feller-buncher 10a, with like numbers identifying like components. The leveling tree feller-buncher 10b further includes a leveling assembly 62 coupled to the turntable 22 and the undercarriage 20 (shown in FIG. 3). The leveling assembly 62 allows the operator to reposition the turntable 22 (along with the attached cab 26 and the boom 30) independently of the orientation of the undercarriage 20 and the tracks 14. Accordingly, the orientation of the turntable 22 (along with the attached cab 26 and the boom 30) is not necessarily influenced by the ground or terrain encountered by the tracks 14. The leveling assembly 62 allows for movement of the turntable 22 along the first axis 34 (moving the turntable 22 towards or away from the leveling assembly 62). In addition, the leveling assembly 62 can pivot side-to-side about a second axis 66 (moving the turntable 22 towards or away from each track 14). Further, the leveling assembly 62 can independently pivot about a third axis 70 and fourth axis 74, the third and fourth axes 70, 74 being approximately perpendicular to the second axis 66. The third and fourth axes 70, 74 facilitate angled positioning of the turntable 22 towards or away from a first end 78 of the track 14 (i.e., a "front" of the tree feller-buncher 10b as illustrated in the orientation of FIG. 2) or towards or away from a second end 82 of the track 14 (i.e., a "rear" of the tree feller-buncher 10b as illustrated in the orientation of FIG. 2). While FIGS. 1-2 illustrate embodiments of a tracked tree feller-buncher 10, in other embodiments, the system disclosed herein can be used in association with a wheeled or non-tracked tree feller-buncher type vehicle.

Figure 3:
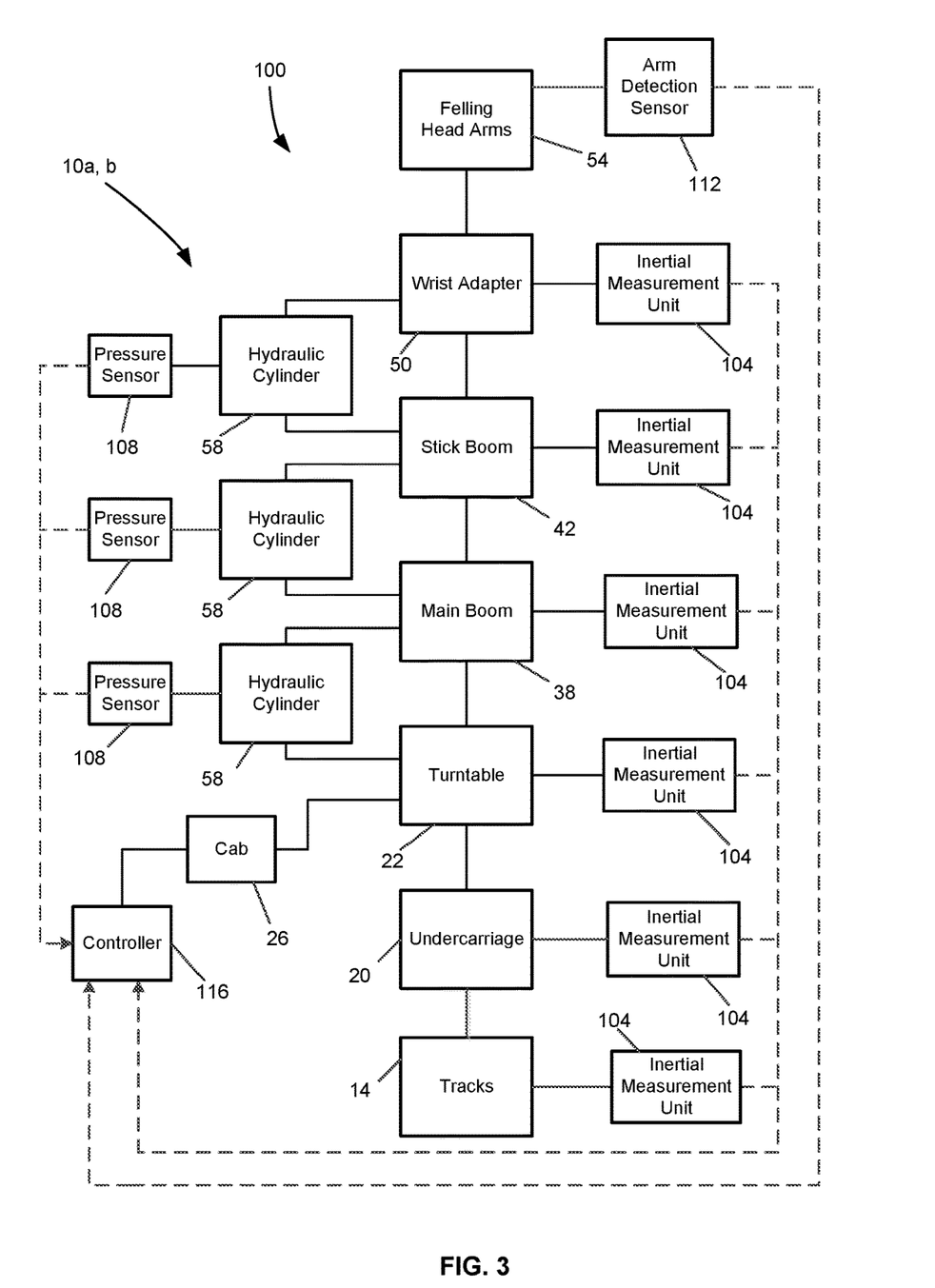
FIG. 3 is a schematic layout of the tree feller-bunchers of FIGS. 1 and 2 illustrating sensor positioning.

FIG. 3 illustrates a schematic view of an embodiment of a sensor arrangement 100 for the tree feller-buncher 10a, 10b. The sensor arrangement 100 provides sensor data that is utilized by a stability warning system 200 to calculate, estimate, or determine a dynamic center of gravity of the tree feller-buncher 10a, 10b during operation. The dynamic center of gravity is analyzed to provide guidance or feedback to the operator when the tree feller-buncher 10a, 10b enters an unstable condition that could lead to the tree feller-buncher 10a, 10b tipping over or rolling over.

Referring to FIG. 3, a plurality of inertial measurement units 104 are positioned at locations on the tree feller-buncher 10a, 10b. Each inertial measurement unit 104 detects changes in the position and/or orientation of the attached component. More specifically, each inertial measurement unit 104 detects changes in (or measures the position and/or orientation of) the attached component along three axes: an X-axis or roll, a Y-axis or yaw, and a Z-axis or pitch. The inertial measurement unit 104 can have a sensor associated with each axis that is being measured, such as a gyroscope or an accelerometer. Each inertial measurement unit 104 provides sensor data associated with the position of the attached component along the three measured axes with reference to a reference position. The reference position can include gravity or a preset location of the component being measured.

In the embodiment illustrated in FIG. 3, a separate inertial measurement unit 104 is connected to one or more of each of the tracks 14, the undercarriage 20, the turntable 22, the main boom 38, the stick boom 42, and the wrist adapter 50. In other embodiments, a separate inertial measurement unit 104 can be connected to one or more of the drive wheels 18. In yet other embodiments, additional or fewer inertial measurement units 104 can be included. For example, in another embodiment an additional inertial measurement unit 104 can be connected to the felling head 46. Each inertial measurement unit 104 tracks the position of the connected component during operation of the tree feller-buncher 10a, 10b.

The inertial measurement unit(s) 104 connected to the tracks 14 can provide a level (or angle or orientation or slope) and/or a center of gravity of each associated track 14 in relation to the ground or terrain encountered by the tracks 14. This can provide confirmation that the tree feller-buncher 10a, 10b is positioned on a slope, and information regarding the angle (or steepness) of the slope. It should be appreciated that the inertial measurement unit(s) 104 connected to the tracks 14 can include an inclinometer.

The inertial measurement unit 104 connected to the undercarriage 20 can provide a level (or angle or orientation or slope) and/or a center of gravity of the undercarriage 20. The inertial measurement unit 104 connected to the turntable 22 can provide a level (or angle or orientation or slope) and/or a center of gravity of the turntable 22. Similarly, the one or more inertial measurement unit(s) 104 connected to one or more components of boom 30 (e.g., the main boom 38, the stick boom 42, and/or the wrist adapter 50) can provide a level (or angle or orientation or slope) and/or a center of gravity of the boom 30 as a whole, or of one or more of the components of the boom 30.

Analysis of level (or angle or orientation or slope) and/or the center of gravity from each inertial measurement unit 104 can provide a level (or angle or orientation or slope) and/or the center of gravity for the tree feller-buncher 10a, 10b as a whole, or of one or more components thereof. For example, information from the inertial measurement unit 104 (or inclinometer) connected to the track(s) 14 analyzed with respect to information from the inertial measurement unit 104 connected to the undercarriage 20 can provide a level (or angle or orientation or slope) of the track(s) 14 with respect to the undercarriage 20, which can be indicative of the slope that the tree feller-buncher 10a, 10b is encountering. As another example, information from the inertial measurement unit 104 connected to the turntable 22 analyzed with respect to information from the inertial measurement unit 104 connected to the undercarriage 20 can provide a level (or angle or orientation or slope) of the turntable 22 with respect to the undercarriage 20. As the turntable 22 rotates with respect to the undercarriage 20 (e.g., to rotate the boom 30), the analysis of information from the inertial measurement unit 104 connected to the turntable 22 with respect to information from the inertial measurement unit 104 connected to the undercarriage 20 can provide a rotational angle and/or a center of gravity of the turntable 22 (and associated components) to the undercarriage 20. It should be appreciated that the examples above are non-limiting, and in other embodiments, information from one or more inertial measurement units 104 can be analyzed and/or compared to provide a level (or angle or orientation or slope), rotational angle, and/or a center of gravity between two or more components, or of the tree feller-buncher 10*a*, 10*b* as a whole.

A plurality of pressure sensors 108 are also positioned at locations on the tree feller-buncher 10*a*, 10*b*. More specifically, a pressure sensor 108 is connected to each hydraulic cylinder 58 associated with the boom 30. The pressure sensors 108 detect when a load is applied to the boom 30 (i.e., when the felling head 46 picks up a tree). In other embodiments, any number of pressure sensors 108 may be positioned on the tree feller-buncher 10*a*, 10*b* to detect application of a load to the boom 30 (e.g., one pressure sensor 108 or two or more pressure sensors 108).

An arm detection sensor 112 is positioned on the felling head 46 to detect the position of each arm 54. Based on the position of each arm 54, the diameter of the tree in the arm is calculated. Based on the species of tree, the combination of tree diameter and tree weight can be used to calculate a tree height. Accordingly, based on the calculated tree diameter and calculated tree weight, a tree height can also be calculated.

Each of the sensors 104, 108, 112 is in communication with a computer processing system or controller 116. The communication can be wired, wireless, or any suitable system for communication (e.g., radio, cellular, BLUETOOTH, etc.). The controller 116 is in communication with the cab 26 through an operator interface (not shown) to provide information relating to the sensors 104, 108, 112 to the operator.

Figure 4:
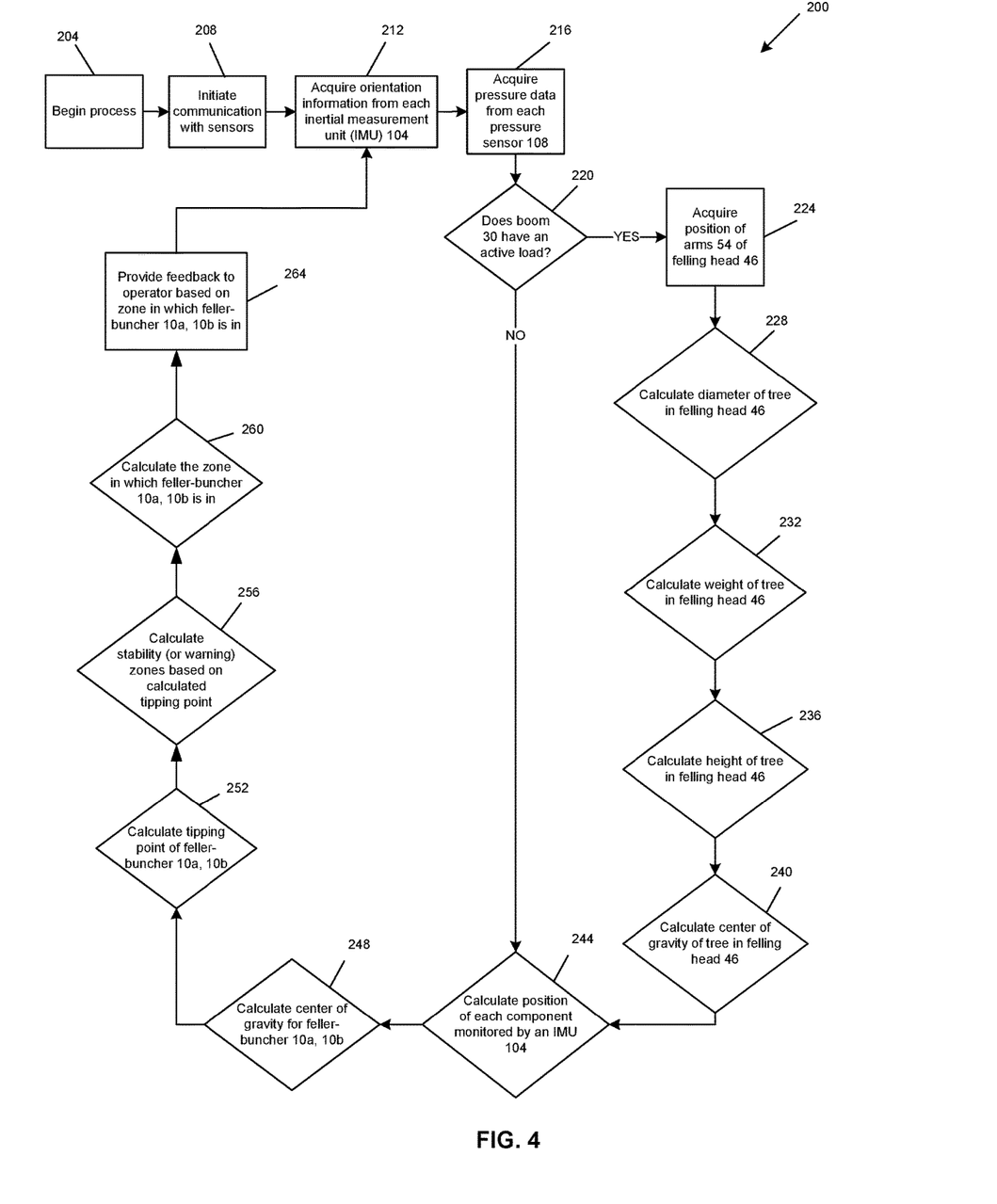
FIG. 4 is a flow diagram of an embodiment of a stability warning system that calculates a dynamic center of gravity of the tree feller-bunchers of FIGS. 1 and 2 during operation.

FIG. 4 illustrates an example of a stability warning system application 200 using information acquired from the sensors 104, 108, 112 to calculate a dynamic center of gravity for the tree feller-buncher 10*a*, 10*b* during operation (i.e., a continuous or real-time center of gravity as components of the tree feller-buncher 10*a*, 10*b* are moving). By calculating the dynamic center of gravity, the tree feller-buncher 10*a*, 10*b* can be used in areas or terrains that were generally previously considered unstable or for which the degree of stability was unknown. These areas or terrains can include steep or unpredictable slopes, or unpredictable ground conditions (e.g., wet, boggy, or unstable soils, surface depressions, frequent stumps, etc.). The application 200 can be a module that operates on (or is associated with) the controller 116. The application 200 may be distributed and stored on the controller 116 (as shown in FIG. 3), and/or can be accessible for execution from a remote location, such as through a web portal, web site, or generally over the Internet. The stability warning system application 200 includes a series of processing instructions or steps that are depicted in flow diagram form.

Referring to FIG. 4, the process begins at step 204, where the tree feller-buncher 10*a*, 10*b* is powered on and in an operational state. The application 200 is initiated, for example, by an interlock with the tree feller-buncher 10*a*, 10*b* such that when the tree feller-buncher 10*a*, 10*b* is in an operational state, the application 200 is also operational.

Next, at step 208 the process initiates communication with each of the sensors 104, 108, 112. Then at step 212, the process acquires orientation information from each inertial measurement unit 104. The orientation information provides the orientation for each component attached to the related inertial measurement unit 104.

Proceeding to step 216, the process acquires pressure data from each pressure sensor 108. The data from the pressure sensor 108 is analyzed at step 220 to calculate whether the boom 30 has an active load (i.e., whether the felling head 46 has engaged and cut or is cutting a tree). To calculate whether the boom 30 has an active load, the measured data from the pressure sensor 108 is analyzed with reference to a set point, which is the data emitted by the pressure sensor 108 when the boom 30 does not have a load (i.e., an unloaded, steady state pressure sensor 108 output). If the calculation results in a "yes," the boom 30 does have an active load and the process proceeds to step 224. If the calculation results in a "no," the boom 30 does not have an active load and the process proceeds to step 244, the details of which are later described.

At step 224, the process proceeds to communicate with the arm detection sensor 112 to acquire the position of the arms 54 of the felling head 46. Next, at step 228, the process calculates a diameter of the tree in the felling head 46. More specifically, the arm detection sensor 112 provides a position of the arms 54. Based on the arm 54 positions, the process calculates an estimated tree diameter (as the process can include preprogrammed distances between the arms 54 based on the position of each arm 54). Once the tree diameter has been calculated, the process proceeds to step 232.

At step 232, the process calculates the weight of the tree in the felling head 46. To calculate the tree weight, the process receives data from the one or more pressure sensors 108 associated with the hydraulic cylinders 58. The process also acquires the position information of the boom 30 from the associated inertial measurement units 104 (e.g., the X, Y, and Z positions of the main boom 38, the stick boom 42, the felling head 46, and the wrist adapter 50, etc.). The process uses the data from the pressure sensors 108 and the position information of the boom 30 to calculate an estimated load weight of the boom 30 and the tree. This calculated load weight is then compared against a preprogrammed or preset weight of the boom 30. The difference results in a calculated weight of the tree in the felling head 46.

Next, at step 236, the process calculates an estimated height of the tree in the felling head 46. The process utilizes the calculated diameter and the calculated weight of the tree, and calculates an estimated height based on the tree species. The tree species can be preprogrammed or preselected by the operator prior to or during operation of the tree feller-buncher 10*a*, 10*b*. The tree height calculation can be, for example, through one or more calculations customized by tree species, or by a preprogrammed lookup table that provides estimated tree heights based on diameter and weight.

Proceeding to step 240, the process utilizes the calculated diameter, calculated weight, and calculated height of the tree to calculate an estimated center of gravity (or center of mass) of the tree in the felling head 46. With the center of gravity of the tree calculated, the process proceeds to step 244.

At step 244, the process acquires position information from each inertial measurement unit 104 to calculate the position of each monitored component. For example, in the embodiment depicted in FIG. 3, the process calculates the position of the undercarriage 20, the turntable 22, the main boom 38, the stick boom 42, and the wrist adapter 50. At step 248, the process utilizes the calculated position of each component and calculates an estimated center of gravity for the tree feller-buncher 10a, 10b. The center of gravity for the tree feller-buncher 10a, 10b is calculated using preprogrammed or preset weights for each monitored component, and if the felling head 46 contains a load (i.e., a tree), the calculated weight and calculated center of gravity for the tree in the felling head 46. In one or more other embodiments, the process can calculate the center of gravity for one or more of the components monitored by the inertial measurement units 104.

At step 252, the process utilizes the calculated position of the components that are monitored with each inertial measurement unit 104, and the current weight of the components (i.e., either unloaded without a tree in the feller head 46, or loaded with a tree in the feller head 46) to calculate an estimated tipping point of the tree feller-buncher 10a, 10b (i.e., a center of gravity where the tree feller-buncher 10a, 10b will begin to tip).

At step 256, the process next calculates stability zones or warning zones based on the calculated tipping point. For example, the process can calculate one or more zones, based on the tipping point calculated center of gravity of the tree feller-buncher 10a, 10b or "tipping point," as calculated in step 252. For example, the process can calculate a zone that is less than 70% of the tipping point (a "green zone"), a zone that is between 70% and 80% of the tipping point (a "yellow zone"), and a zone that is between 80% and 90% of the tipping point (a "red zone"). It should be appreciated that the zones can be any percentage or range of percentages that are less than the tipping point calculated center of gravity of the tree feller-buncher 10a, 10b. This is to provide sufficient warning to the operator before the tree feller-buncher 10a, 10b begins to tip. In addition, in other embodiments, the percentages of the tipping point can change based on the positions of the components calculated by the process. Stated otherwise, the percentages for one or more of the zones can be narrower, closer to the tipping point, and/or further from the tipping point. For example, in circumstances where the components are felling trees in a steep or undulating terrain, the percentages for one or more of the zones can be narrower and/or closer to the tipping point, as the actual calculated center of gravity of the tree feller-buncher 10a, 10b may inherently be closer to the calculated tipping point center of gravity of the tree feller-buncher 10a, 10b due to the terrain.

At step 260, the process calculates in which zone the tree feller-buncher 10a, 10b is currently in. More specifically, the process utilizes the currently calculated center of gravity of the tree feller-buncher 10a, 10b (calculated in step 248) and compares that currently calculated center of gravity with the calculated zones (calculated in step 256). Based on the determined current zone of the tree feller-buncher 10a, 10b, the process then provides feedback to the operator at step 264.

The feedback provided to the operator at step 264 can be any suitable feedback to notify the operator of the current stability zone. For example, the feedback can be visual, with a depiction or illustration of the tree feller-buncher 10a, 10b and an illustration of the one or more calculated stability zones. In addition, or optionally, the process can provide audible feedback to the operator. For example, if the tree feller-buncher 10a, 10b enters into the "yellow zone" or "red zone," the process can emit one or more audible alarms or klaxons to notify the operator. In addition, or optionally, the process can provide haptic feedback to the operator. For example, if the tree feller-buncher 10a, 10b enters into the "yellow zone" or "red zone," the process can shake or vibrate one or more controls used by the operator to control or move components of the tree feller-buncher 10a, 10b. In addition, or optionally, the process can slow and/or terminate one or more operations or movements or functions of the tree feller-buncher 10a, 10b. For example, if the tree feller-buncher 10a, 10b enters into the "red zone," the process can terminate further movement of the component that is causing the lack of stability (or further movement in a direction that moves the center of gravity closer to the calculated tipping center of gravity). The process can also only allow for operation or movement of the tree feller-buncher 10a, 10b in a direction that is back to the "yellow zone" or "green zone."

The process then returns to step 212 where the process above repeats to continually calculate the center of gravity of the tree feller-buncher 10a, 10b based on tree feller-buncher 10a, 10b position, a calculated tipping point center of gravity of the tree feller-buncher 10a, 10b based on tree feller-buncher 10a, 10b position, and provide operator feedback based on the calculated center of gravity versus the calculated tipping point center of gravity.

In other embodiments, the process and system 200 can utilize terrain information (e.g., global positioning system, or GPS, data for an area, LIDAR terrain data, satellite data, etc.), which can be preloaded or real time accessible, along with GPS data associated with the location (or position) of the tree feller-buncher 10a, 10b (e.g., a GPS unit positioned on the tree feller-buncher 10a, 10b to provide position information, etc.) to provide predictive warnings. For example, the system 200 can use real time GPS positioning information regarding the position of the tree feller-buncher 10a, 10b and/or a direction of travel of the tree feller-buncher 10a, 10b to establish a geo-reference of the tree feller-buncher 10a, 10b. Using this geo-reference information, and analyzing it in view of terrain information, the system 200 can provide notice or warnings to the operator indicating the tree feller-buncher 10a, 10b is nearing terrain that could create a risk of instability (e.g., steep, dangerous, or otherwise risky terrain for tree feller-buncher operation).

It should be appreciated that the process and system 200 can track (or log or save or store) warnings or feedback generated in step 264, and further the operator's response to the warnings or feedback. The information can be stored (or saved) locally (e.g., in an operational recorder, "black box," etc.) on the tree feller-buncher 10a, 10b, or distributed to a remote device (e.g., a server, hand-held device, cellular phone, tablet computer, etc.). By tracking this information, operator behavior can be monitored, and in certain circumstances addressed to improve operational performance and reduce risk.

Various features and advantages of the disclosure are set forth in the following claims.

What is claimed is:

1. A stability warning system for a tree feller-buncher comprising:
   a first inertial measurement unit configured to measure an orientation of an undercarriage of the tree feller-buncher carrying at least one track;
   a second inertial measurement unit configured to measure an orientation of a boom coupled to a turntable;
   a felling head operably connected to the boom;
   a controller operable to estimate a center of gravity of the tree feller-buncher based on the measured orientation of the undercarriage and the measured orientation of the boom; and
   an arm position detection sensor operably coupled to a plurality of arms coupled to the felling head and operable to engage a tree, the controller operable to estimate a diameter of the tree engaged in the plurality of arms based on the measured arm position of the felling head.

2. The stability warning system of claim 1, further comprising a third inertial measurement unit configured to measure an orientation of the turntable rotatably coupled to the undercarriage, the controller further operable to estimate the center of gravity of the tree feller-buncher based on the measured orientation of the undercarriage, the measured orientation of the boom, and the measured orientation of the turntable.

3. The stability warning system of claim 1, the boom further comprising a main boom pivotably connected to the turntable, a stick boom operably connected to the main boom, and a wrist adapter operably connected to the stick boom, wherein the second inertial measurement unit is configured to measure the orientation of the main boom.

4. The stability warning system of claim 3, further comprising:
a fourth inertial measurement unit configured to measure the orientation of the stick boom; and
a fifth inertial measurement unit configured to measure the orientation of the wrist adapter, the controller further operable to estimate the center of gravity of the tree feller-buncher based additionally on the measured orientation of the stick boom and the measured orientation of the wrist adapter.

5. The stability warning system of claim 1, further comprising:
at least one hydraulic cylinder operably connected to the boom; and
a pressure sensor configured to measure a pressure within at least one hydraulic cylinder, the controller operable to detect a tree in the felling head and estimate a weight of the tree in the felling head based on the measured pressure.

6. The stability warning system of claim 1, further comprising:
at least one hydraulic cylinder operably connected to the boom; and
a pressure sensor configured to measure a pressure within at least one hydraulic cylinder,
the controller further operable to detect a tree in the felling head and estimate a weight of the tree in the felling head based on the measured pressure, and
the controller configured to estimate a height of the tree based in part on the calculated diameter of the tree and the calculated weight of the tree.

7. The stability warning system of claim 6, wherein the controller is configured to estimate a center of gravity of the tree based in part on the calculated diameter of the tree, the calculated weight of the tree, and the calculated height of the tree.

8. The stability warning system of claim 7, wherein the controller is configured to repeatedly estimate the center of gravity of the tree feller-buncher during operation thereof using the calculated center of gravity of the tree.

9. The stability warning system of claim 1, wherein the controller is configured to repeatedly calculate a tipping point center of gravity of the tree feller-buncher during operation thereof based on the measured orientation of the undercarriage and the measured orientation of the boom.

10. The stability warning system of claim 9, wherein the controller is configured to estimate at least one warning zone that is indicative of the tree feller-buncher nearing the estimated tipping point center of gravity.

11. The stability warning system of claim 10, wherein the controller is operable to transmit a notification to an operator when the estimated center of gravity of the tree feller-buncher falls within the at least one warning zone.

12. The stability warning system of claim 11, wherein the notification to the operator is an audible notification.

13. The stability warning system of claim 11, wherein the notification to the operator is a visual notification.

14. The stability warning system of claim 11, wherein the notification to the operator is a haptic notification through at least one control used by the operator to operate the tree feller-buncher.

15. The stability warning system of claim 11, wherein the notification to the operator is to block further movement of the tree feller-buncher in a direction that moves the center of gravity closer to the estimated tipping center of gravity.

16. A stability warning system for a tree feller-buncher comprising:
a first inertial measurement unit configured to measure an orientation of an undercarriage of the tree feller-buncher carrying at least one track;
a second inertial measurement unit configured to measure an orientation of a boom coupled to a turntable;
a felling head operably connected to the boom;
at least one hydraulic cylinder operably connected to the boom;
a pressure sensor configured to measure a pressure within at least one hydraulic cylinder; and
a controller operable to estimate a center of gravity of the tree feller-buncher based on the measured orientation of the undercarriage and the measured orientation of the boom, and
the controller further operable to detect a tree in the felling head and estimate a weight of the tree in the felling head based on the measured pressure.

17. The stability warning system of claim 16, further comprising a third inertial measurement unit configured to measure an orientation of the turntable rotatably coupled to the undercarriage, the controller further operable to estimate the center of gravity of the tree feller-buncher based on the measured orientation of the undercarriage, the measured orientation of the boom, and the measured orientation of the turntable.

18. The stability warning system of claim 16, the boom further comprising a main boom pivotably connected to the turntable, a stick boom operably connected to the main boom, and a wrist adapter operably connected to the stick boom, wherein the second inertial measurement unit is configured to measure the orientation of the main boom.

19. The stability warning system of claim 18, further comprising:
a fourth inertial measurement unit configured to measure the orientation of the stick boom; and
a fifth inertial measurement unit configured to measure the orientation of the wrist adapter, the controller further operable to estimate the center of gravity of the tree feller-buncher based additionally on the measured orientation of the stick boom and the measured orientation of the wrist adapter.

20. The stability warning system of claim 16, further comprising:
an arm position detection sensor configured to measure a position of a plurality of arms coupled to the felling head, the plurality of arms configured to engage a tree;
the controller operable to estimate a diameter of the tree engaged in the plurality of arms based on the measured position of the plurality of arms, and the controller configured to estimate a height of the tree based in part on the calculated diameter of the tree and the calculated weight of the tree.

21. The stability warning system of claim 20, wherein the controller is configured to estimate a center of gravity of the tree based in part on the calculated diameter of the tree, the calculated weight of the tree, and the calculated height of the tree.

22. The stability warning system of claim 21, wherein the controller is configured to repeatedly estimate the center of gravity of the tree feller-buncher during operation thereof using the calculated center of gravity of the tree.

23. The stability warning system of claim 16, wherein the controller is configured to repeatedly calculate a tipping point center of gravity of the tree feller-buncher during operation thereof based on the measured orientation of the undercarriage and the measured orientation of the boom.

24. The stability warning system of claim 23, wherein the controller is configured to estimate at least one warning zone that is indicative of the tree feller-buncher nearing the estimated tipping point center of gravity.

25. The stability warning system of claim 24, wherein the controller is operable to transmit a notification to an operator when the estimated center of gravity of the tree feller-buncher falls within the at least one warning zone.

26. The stability warning system of claim 25, wherein the notification to the operator is an audible notification.

27. The stability warning system of claim 25, wherein the notification to the operator is a visual notification.

28. The stability warning system of claim 25, wherein the notification to the operator is a haptic notification through at least one control used by the operator to operate the tree feller-buncher.

29. The stability warning system of claim 25, wherein the notification to the operator is to block further movement of the tree feller-buncher in a direction that moves the center of gravity closer to the estimated tipping center of gravity.

30. A stability warning system for a tree feller-buncher comprising:
a first inertial measurement unit configured to measure an orientation of an undercarriage of the tree feller-buncher carrying at least one track;
a second inertial measurement unit configured to measure an orientation of a boom coupled to a turntable;
a felling head operably connected to the boom;
an arm position detection sensor configured to measure a position of a plurality of arms coupled to the felling head, the plurality of arms configured to engage a tree;
at least one hydraulic cylinder operably connected to the boom; and
a pressure sensor configured to measure a pressure within at least one hydraulic cylinder,
a controller operable to estimate a center of gravity of the tree feller-buncher based on the measured orientation of the undercarriage and the measured orientation of the boom,
the controller further operable to estimate a diameter of the tree engaged in the plurality of arms based on the measured position of the plurality of arms,
the controller further operable to detect a tree in the felling head and estimate a weight of the tree in the felling head based on the measured pressure, and
the controller configured to estimate a height of the tree based in part on the calculated diameter of the tree and the calculated weight of the tree.

31. The stability warning system of claim 30, further comprising a third inertial measurement unit configured to measure an orientation of the turntable rotatably coupled to the undercarriage, the controller further operable to estimate the center of gravity of the tree feller-buncher based on the measured orientation of the undercarriage, the measured orientation of the boom, and the measured orientation of the turntable.

32. The stability warning system of claim 30, the boom further comprising a main boom pivotably connected to the turntable, a stick boom operably connected to the main boom, and a wrist adapter operably connected to the stick boom, wherein the second inertial measurement unit is configured to measure the orientation of the main boom.

33. The stability warning system of claim 32, further comprising:
a fourth inertial measurement unit configured to measure the orientation of the stick boom; and
a fifth inertial measurement unit configured to measure the orientation of the wrist adapter, the controller further operable to estimate the center of gravity of the tree feller-buncher based additionally on the measured orientation of the stick boom and the measured orientation of the wrist adapter.

34. The stability warning system of claim 30, wherein the controller is configured to estimate a center of gravity of the tree based in part on the calculated diameter of the tree, the calculated weight of the tree, and the calculated height of the tree.

35. The stability warning system of claim 34, wherein the controller is configured to repeatedly estimate the center of gravity of the tree feller-buncher during operation thereof using the calculated center of gravity of the tree.

36. The stability warning system of claim 30, wherein the controller is configured to repeatedly calculate a tipping point center of gravity of the tree feller-buncher during operation thereof based on the measured orientation of the undercarriage and the measured orientation of the boom.

37. The stability warning system of claim 36, wherein the controller is configured to estimate at least one warning zone that is indicative of the tree feller-buncher nearing the estimated tipping point center of gravity.

38. The stability warning system of claim 37, wherein the controller is operable to transmit a notification to an operator when the estimated center of gravity of the tree feller-buncher falls within the at least one warning zone.

39. The stability warning system of claim 38, wherein the notification to the operator is an audible notification.

40. The stability warning system of claim 38, wherein the notification to the operator is a visual notification.

41. The stability warning system of claim 38, wherein the notification to the operator is a haptic notification through at least one control used by the operator to operate the tree feller-buncher.

42. The stability warning system of claim 38, wherein the notification to the operator is to block further movement of the tree feller-buncher in a direction that moves the center of gravity closer to the estimated tipping center of gravity.

* * * * *